United States Patent
Bostick et al.

(10) Patent No.: US 9,971,426 B2
(45) Date of Patent: May 15, 2018

(54) LI-FI ENABLED STYLUS WITH VARIABLE AREA RANGE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 15/219,386

(22) Filed: Jul. 26, 2016

(65) Prior Publication Data

US 2018/0032156 A1    Feb. 1, 2018

(51) Int. Cl.
| | |
|---|---|
| *G06F 3/00* | (2006.01) |
| *G06F 3/038* | (2013.01) |
| *G06F 3/0354* | (2013.01) |
| *G09G 3/32* | (2016.01) |
| *G06F 3/03* | (2006.01) |
| *G06K 19/06* | (2006.01) |

(52) U.S. Cl.
CPC .......... *G06F 3/0386* (2013.01); *G06F 3/0317* (2013.01); *G06F 3/03542* (2013.01); *G06K 19/06037* (2013.01); *G09G 3/32* (2013.01)

(58) Field of Classification Search
CPC ............... G09G 3/32; G06K 19/06037; G06F 3/03542; G06F 3/0386; G06F 3/0317
See application file for complete search history.

(56) References Cited

U.S. PATENT DOCUMENTS

| | | | |
|---|---|---|---|
| 4,286,311 A | 8/1981 | Maglica | |
| 5,579,481 A | 11/1996 | Drerup | |
| 7,499,035 B2 | 3/2009 | Kolmykov-Zotov et al. | |
| 7,599,562 B2 | 10/2009 | Liu | |
| 8,812,827 B2 | 8/2014 | Malasani | |
| 9,176,604 B2 | 11/2015 | Krah et al. | |
| 9,208,001 B2 | 12/2015 | Paschke et al. | |
| 2005/0073508 A1* | 4/2005 | Pittel | G06F 1/3203 |
| | | | 345/175 |

(Continued)

FOREIGN PATENT DOCUMENTS

JP    2014049077 A    3/2014

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Muhammad N Edun
(74) *Attorney, Agent, or Firm* — Law Office of Jim Boice

(57) ABSTRACT

A Li-Fi enabled stylus includes a Li-Fi receiver, a stylus memory, a Li-Fi source, and a movable lens. The receiver detects multiple channels of information-encoded light from a first Li-Fi enabled display. The stylus memory stores information contained in the multiple channels of information-encoded light from the first Li-Fi enabled display. The Li-Fi source transmits the information stored in the stylus memory onto a second Li-Fi enabled display via multiple channels of information-encoded light. The movable lens adjusts a range of view of the Li-Fi enabled stylus.

20 Claims, 9 Drawing Sheets

(56) References Cited

U.S. PATENT DOCUMENTS

2012/0050207 A1     3/2012    Westhues et al.
2017/0176170 A1*   6/2017    Sesko .................. G01B 11/005

OTHER PUBLICATIONS

R. Yang, "Tstylus: Data Transfer Between Screens At the Point of a Stylus", Jul. 25, 2013, <http://www.atelier.net/en/trends/articles/tsylus-data-transfer-between-screens-point-stylus_422974>, pp. 1-2.
Anonymous, "What is Li-Fi? And what are the pros and cons of it?" <https://www.quora.com/What-is-Li-Fi_And_what_are_the_pros_and_cons_of it?> retrieved Apr. 11, 2016, pp. 1-5.
Anonymous, "Photodiode", Wikipedia.org, Wikimedia Foundation, retrieved Apr. 8, 2016, pp. 1-5.
M. Prigg, "Is the iPen coming? Apple patents smart digital stylus that can capture handwriting and drawings", dailymail.com, Dec. 30, 2014, pp. 1-2.
Anonymous, "Principle and Feature of Various Detection Methods (1)" Hitachi, www.hitachi-hightech.com, Retrieved Apr. 11, 2016, pp. 1-3.
M. Lazar et al., "Li-Fi Design for High Speed Data Transmission", ARPN, ARPN Journal of Engineering and Applied Sciences, vol. 10, No. 14, Aug. 2015, pp. 5999-6003.
Anonymous, "Application Notes", OSI Optoelectronics, osioptoelectronics.com, 2013, pp. 74-81.

* cited by examiner

LI-FI ENABLED STYLUS WITH VARIABLE AREA RANGE

BACKGROUND

The present disclosure relates to the field of computers, and specifically to the field of computers that use input styluses. Still more specifically, the present disclosure relates to the field of input styluses that support Li-Fi.

SUMMARY

In one or more embodiments of the present invention, a Li-Fi enabled stylus includes a Li-Fi receiver, a stylus memory, a Li-Fi source, and a movable lens. The receiver detects multiple channels of information-encoded light from a first Li-Fi enabled display. The stylus memory stores information contained in the multiple channels of information-encoded light from the first Li-Fi enabled display. The Li-Fi source transmits the information stored in the stylus memory onto a second Li-Fi enabled display via multiple channels of information-encoded light. The movable lens adjusts a range of view of the Li-Fi enabled stylus.

In one or more embodiments of the present invention, a method and/or computer program product move information from a first Li-Fi enabled display to a second Li-Fi enabled display. A Li-Fi stylus is positioned against a first Li-Fi enabled display. A lens controller within the Li-Fi stylus adjusts a position of a movable lens within the Li-Fi stylus, where moving the position of the movable lens adjusts a reception range of view of the Li-Fi enabled stylus for receiving a first set of multiple channels of information-encoded light from the first Li-Fi enabled display as the Li-Fi stylus is positioned against the first Li-Fi enabled display. A Li-Fi receiver within a Li-Fi stylus receives the first set of multiple channels of information-encoded light from the first Li-Fi enabled display, where the first set of multiple channels of information-encoded light are selectively received by the Li-Fi receiver within the Li-Fi stylus according to the reception range of view of the Li-Fi enabled stylus. A stylus controller decodes information from the first set of multiple channels of information-encoded light. One or more processors store, into a stylus memory within the Li-Fi stylus, the decoded information from the first set of multiple channels of information-encoded light from the first Li-Fi enabled display. The Li-Fi stylus is then positioned against a second Li-Fi enabled display. The lens controller within the Li-Fi stylus adjusts the position of the movable lens within the Li-Fi stylus, where moving the position of the movable lens adjusts a transmission range of view of the Li-Fi enabled stylus for transmitting a second set of multiple channels of information-encoded light to a second Li-Fi enabled display as the Li-Fi stylus is positioned against the second Li-Fi enabled display. The stylus controller encodes the decoded information stored in the stylus memory to create encoded information. A Li-Fi transmitter within the Li-Fi stylus transmits the encoded information via the second set of multiple channels of information-encoded light to the second Li-Fi enabled display, where the second set of multiple channels of information-encoded light are selectively transmitted from the Li-Fi stylus to the second Li-Fi enabled display according to the transmission range of view of the Li-Fi enabled stylus.

DETAILED DESCRIPTION

Figure 1:
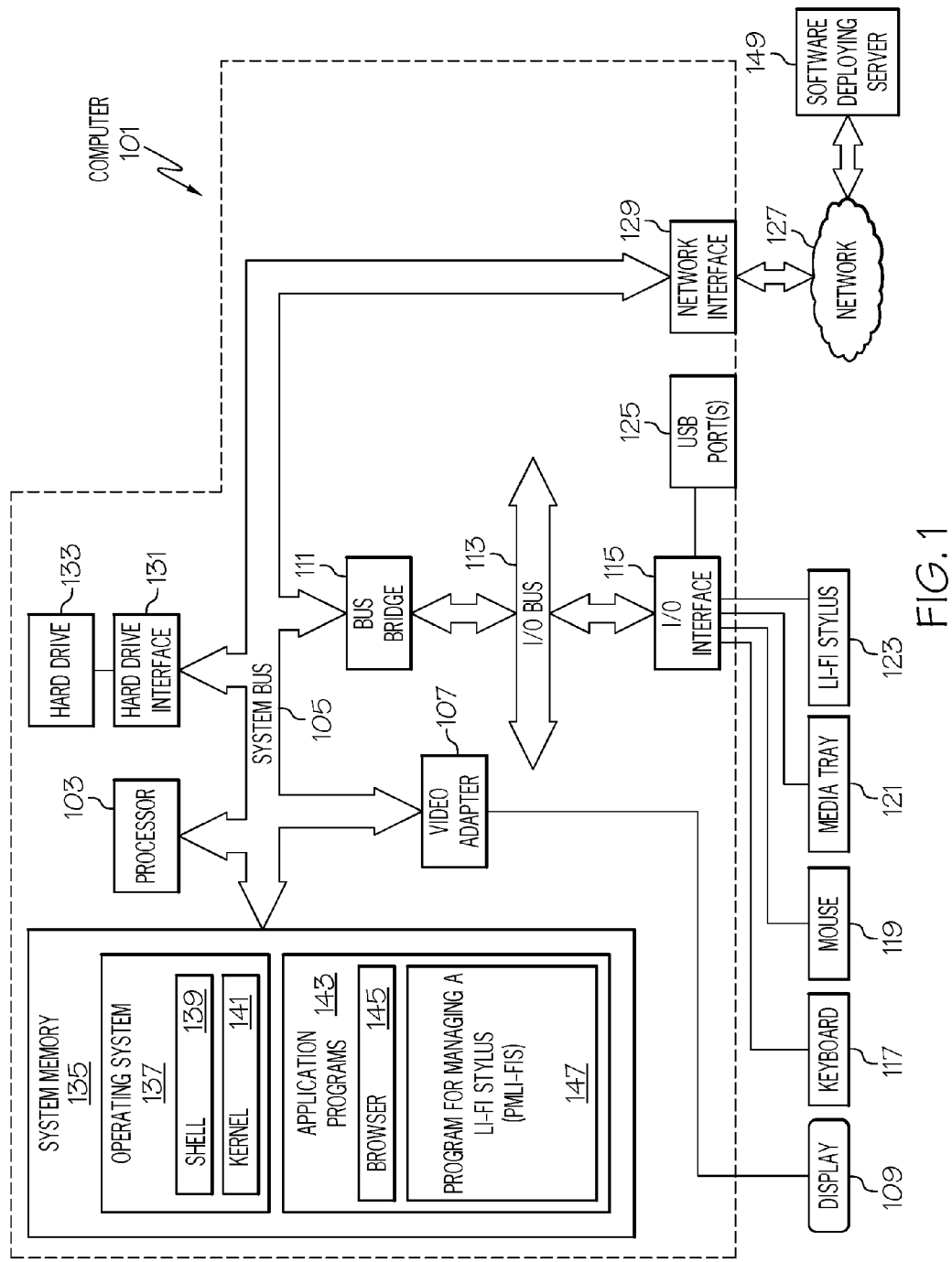
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 shown in FIG. 1 and/or storage systems within the storage cloud 507 shown in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. In a preferred embodiment, display 109 is a Li-Fi enabled display that is capable of 1) receiving light-conveyed information and 2) transmitting light-conveyed information. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a Li-Fi stylus 123 (described below), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices via a network 127 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a Wi-Li network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a Program for Managing a Li-Fi Stylus (PMLi-FiS) 147. PMLi-FiS 147 includes code for implementing the processes described below, including those described in FIGS. 2-7. In one embodiment, computer 101 is able to download PMLi-FiS 147 from software deploying server 149, including in an on-demand basis, wherein the code in PMLi-FiS 147 is not downloaded until needed for execution. In one embodiment of the present invention, software deploying server 149 performs all of the functions associated with the present invention (including execution of PMLi-FiS 147), thus freeing computer 101 from having to use its own internal computing resources to execute PMLi-FiS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 3:
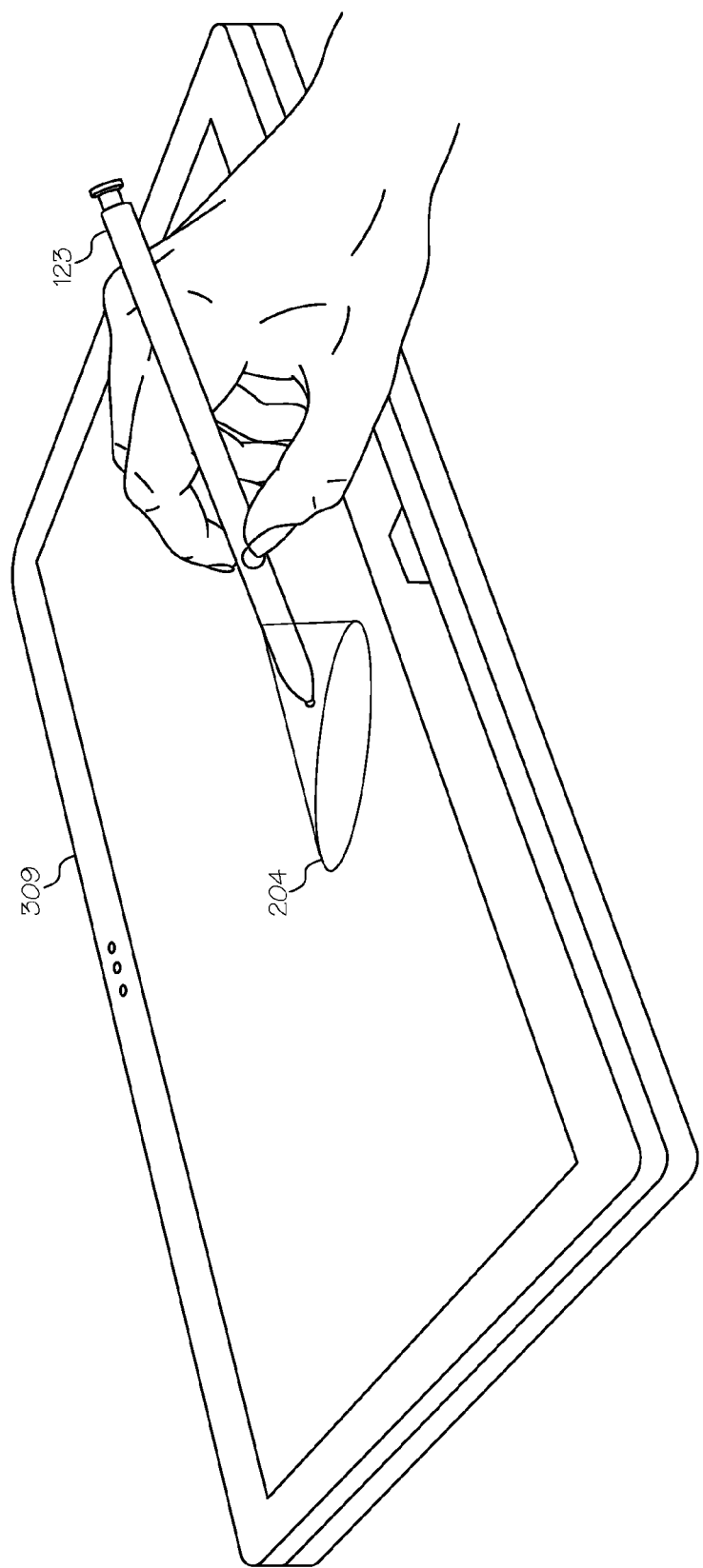
FIG. 3 depicts a user using the novel Li-Fi stylus shown in FIG. 2 with an exemplary Li-Fi enabled display in accordance with one or more embodiments of the present invention.

As described herein, the present invention provides a new and useful stylus device that incorporates the use of Li-Fi with a photodiode layer to pick up a large file or files quickly for storage into the stylus internal storage and/or an associated cloud repository (e.g., in a storage cloud such as the storage cloud 303 shown in FIG. 3). As described herein the stylus can be moved to another location on the same machine or even a different machine, thus enabling it to place the captured files automatically to wherever it is pointing. Conceptually, the Li-Fi stylus described herein is able to act like a baster that can "slurp up" any set of files and copy them or move them ("spit out") wherever needed in a very fast manner. The present invention takes advantage of the very high speed of Li-Fi, thus allowing a user to "pick up" a file or files quickly from one device and "put them" on other devices very rapidly without the need to attach any hardware to the other devices.

As described herein, the positioning of the lens within the stylus can be adjusted, thus allowing the "light area" to cover more or less area of the screen, which automatically allows the selection of more or less files, pictures and/or folders to be transmitted to the stylus' internal storage or associated cloud repository.

A stylus is a small pen-shaped instrument that is used to input commands to a computer screen, mobile device or graphics tablet. With touchscreen devices, a user places a stylus on the surface of the screen to draw or make selections by tapping the stylus on the screen. However, with Li-Fi, the user is able to exchange information with a Li-Fi enabled screen using information-encoded light, such as light from one or more light emitting diodes (LEDs).

Light Fidelity (Li-Fi) is a bidirectional, high-speed and wireless communication technology similar to Wi-Fi. However, rather than using radio frequency signals (as used by Wi-Fi), Li-Fi uses light (visible or invisible) as the transmission medium. That is, Li-Fi modulates (e.g., turns off and on) a light source at a very high rate. Each time the light turns on, a binary "1" is indicated, and each time the light turns off, a binary "0" is indicated (or vice versa, depending on the setup/standard being used). In order to take advantage of the speed of Li-Fi, the light source needs to have a very fast on/off transition speed, such as that provided by light emitting diodes (LEDs).

Li-Fi as used in the present invention (including the new and novel Li-Fi stylus) differs from fiber optics in several manners. First, Li-Fi is fiber-free, since the light transmits through air. Thus, Li-Fi is not spatially limited by one or more optical fibers. Second, Li-Fi can selectively "see" multiple channels. That is, in a fiber optic system, the number of channels is set by how many channels are being transmitted within the optical fiber. The present invention, however, allows the user/system to expand and contract the number of channels in use by adjusting the lens within the Li-Fi stylus, as described herein. Third, Li-Fi is more secure than Wi-Fi, since light does not penetrate walls.

Figure 2:
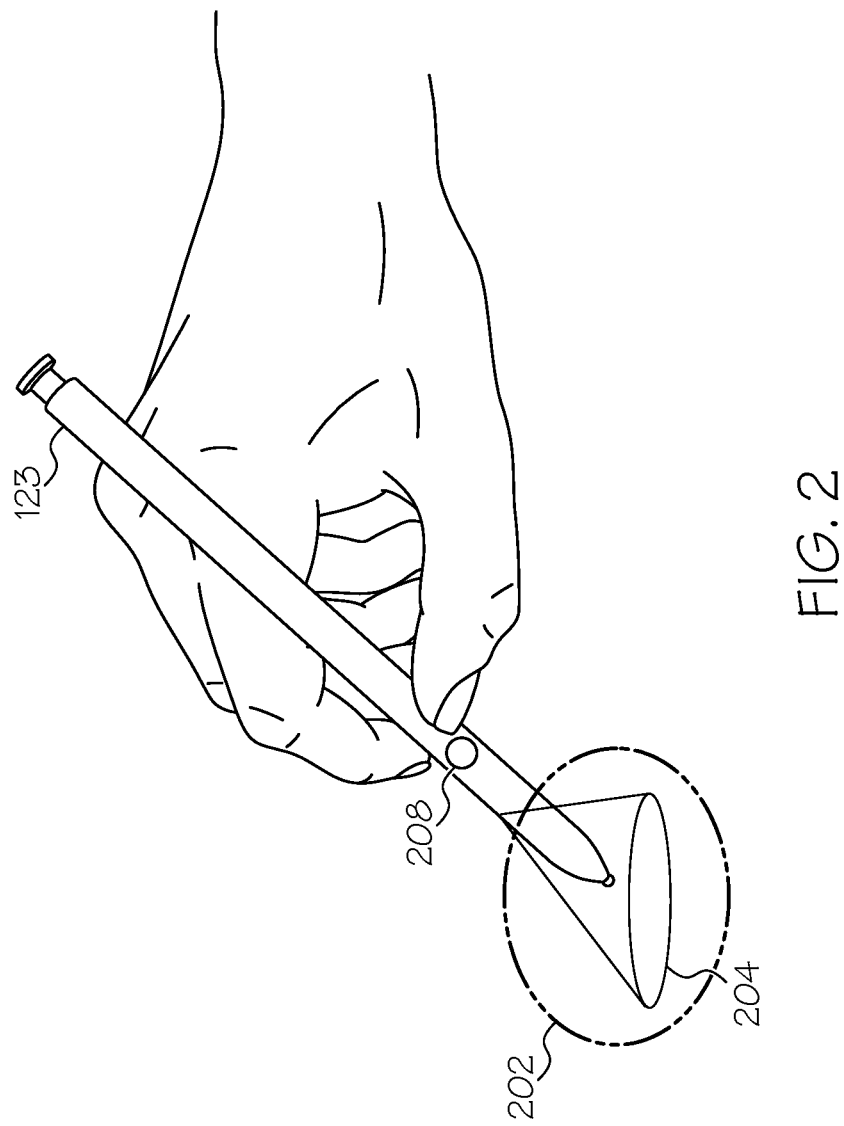
FIG. 2 illustrates a novel Li-Fi stylus with an adjustable spread of light.

With reference now to FIG. 2, a novel Li-Fi stylus 123 with an adjustable spread of light 204 from LED light 202 emitted by the Li-Fi stylus 123 is depicted. As represented in FIG. 2, the user enables a Li-Fi transmission unit in the Li-Fi stylus 123 by pressing a lens controller button 208 on the stylus surface. As described below, the user is also able to control the lens parameter (and thus the spread of light 204) by adjusting the lens distance from the source LED light within the Li-Fi stylus 123, and can thus control the spread of light being shown onto a Li-Fi enabled display as well as the area on the Li-Fi enabled display from which light is received by the Li-Fi stylus. Thus, data will be transmitted to and from the entire boundary of the light. As this boundary is adjustable by the user, the user can adjust the light to cover the file or files he wishes to copy, and then invoke the function. That is, the spread of light 204 provides a visual cue to the user, such that wherever the light is shining identifies/defines not only where light information is being presented onto the Li-Fi enabled display, but which light information from the Li-Fi enabled display is being received by the Li-Fi stylus.

As such, the Li-Fi stylus is not just a fiber optic transmission device, but rather is an optical device that is able to create a "mini" Li-Fi network that has more or fewer channels according to how the user configures the lens on the Li-Fi stylus. That is, if the spread of light 204 from the Li-Fi stylus 123 is small, then the number of light channels is likewise small. However, if the spread of light 204 from the Li-Fi stylus 123 is large, then the number of light channels is likewise numerous.

FIG. 3 depicts a user using the novel Li-Fi stylus shown in FIG. 2 with an exemplary Li-Fi enabled display 309 (analogous to the display 109 shown in FIG. 1 and having Li-Fi capabilities as described herein) in accordance with one or more embodiments of the present invention. As the user positions the Li-Fi stylus 123 against (or near) the Li-Fi enabled display 309, the amount of the spread of light 204 is adjusted by moving a lens inside the Li-Fi stylus 123. As such, any displayed information on the Li-Fi enabled display 309 within the spread of light 204 is captured by the Li-Fi stylus 123 when in read/capture mode. Similarly, any area on the Li-Fi enabled display 309 within the spread of light 204 is a target area for information-encoded light being transmitted by the Li-Fi stylus 123 when in write/transmission mode.

Figure 4:
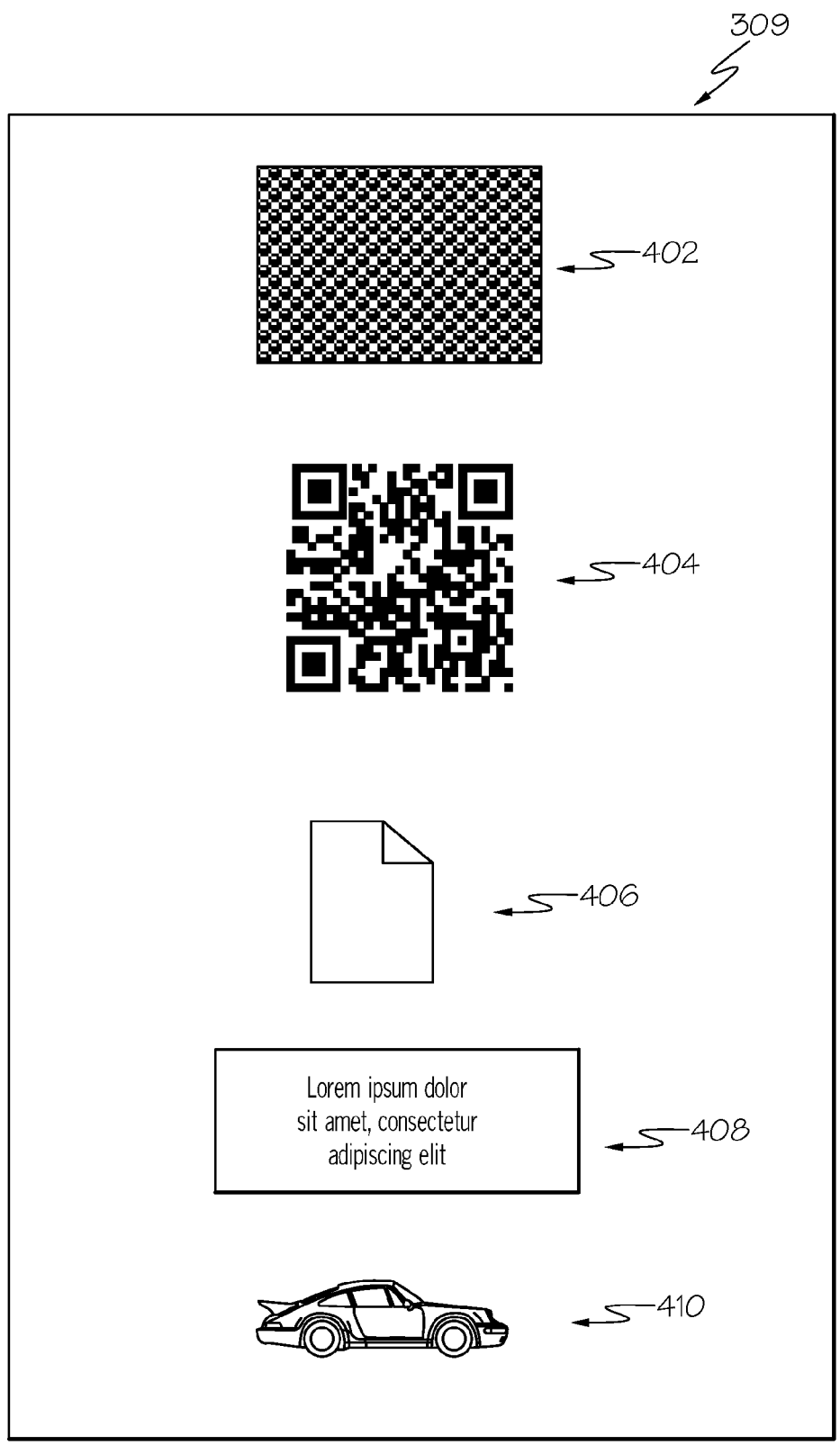
FIG. 4 illustrates additional detail of the exemplary Li-Fi enabled display shown in FIG. 3 in accordance with one or more embodiments of the present invention.

With reference now to FIG. 4, additional detail of the exemplary Li-Fi enabled display 309 shown in FIG. 3 is presented in accordance with one or more embodiments of the present invention. Various types of information can be displayed on and imparted to Li-Fi enabled display 309.

For example, a binary photosensor array 402 can be a conduit for multiple light channels of information.

In another example, a matrix barcode 404 can provide a pattern that, when decoded, provides a variety of information about any product, subject, etc.

In another example, a file icon 406 can represent a file and/or folder stored in a database.

In another example, a text display 408 can depict text information.

In another example, a video display 410 can depict a moving and/or still photo image.

Figure 5:
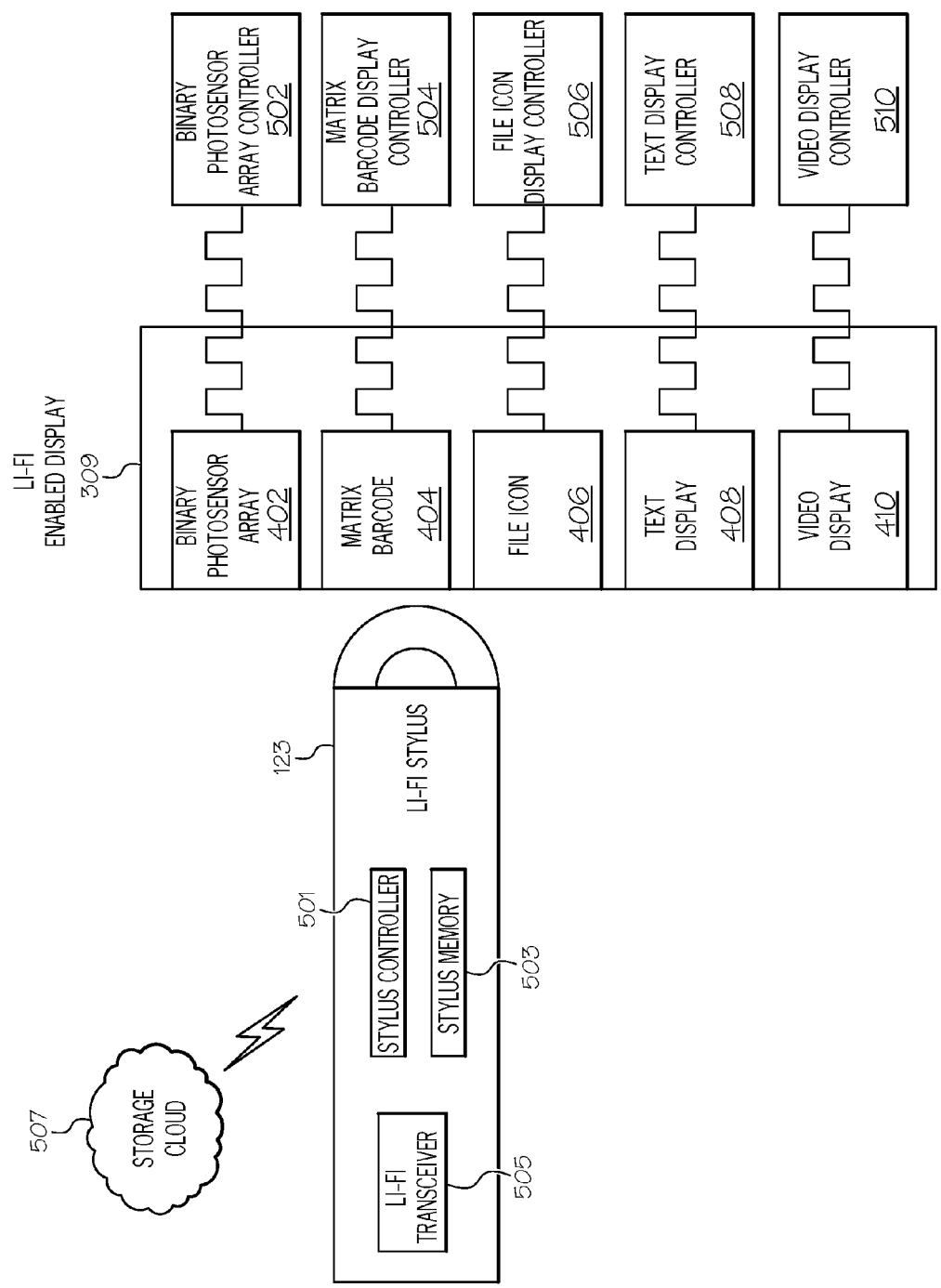
FIG. 5 depicts additional detail of the Li-Fi enabled display illustrated in FIG. 4 in accordance with one or more embodiments of the present invention.

With reference now to FIG. 5, additional detail of the Li-Fi enabled display 309 illustrated in FIG. 4 in accordance with one or more embodiments of the present invention is presented.

Assume that the Li-Fi enabled display 309 has the binary photosensor array 402, which is a two-dimensional array of LEDs and/or photoreceptors. That is, in an embodiment of the present invention binary photosensor array 402 has an array of LEDs that produce information-encoded light. In an embodiment of the present invention binary photosensor array 402 has an array of photoreceptors that receive information-encoded light.

For example, assume that binary photosensor array 402 has a two-dimensional array of LEDs. As such, a binary photosensor array controller 502 (which has or is controlled by one or more processors) sends pulses to one or more of the LEDs, which results in information-encoded light (e.g., based on the LEDs being turned off and on to generate binary signal information, adjusting the light intensity of the LEDs to generate analog signal information, etc.) being emitted from the LEDs. In this embodiment, the Li-Fi stylus 123 receives (e.g., by photosensors in the Li-Fi source/receiver 610 shown in FIG. 6) the information-encoded light being generated by the LED. The stylus controller 501 (which may be processor-based) decodes the information-encoded light and stores the decoded information in a stylus memory 503. By storing the decoded information only in the stylus memory 503, a high level of security is achieved, since only a possessor of the Li-Fi stylus 123 will hold the decoded information from the Li-Fi enabled display 309 (and the system, such as computer 101 shown in FIG. 1, that supports the Li-Fi enabled display 309).

Alternatively, in an embodiment of the present invention, a Li-Fi transceiver 505 sends some or all of the decoded information to a remote storage device, such as a storage device in a storage cloud 507 (e.g., an Internet-based storage server). That is, the binary photosensor array controller 502 generates and affixes an identification tag to each block of information being conveyed by the information encoded light being generated by the LEDs. Alternatively, the stylus controller 501 generates and affixes an identification tag to each block of information being conveyed by the information encoded light being generated by the LEDs. In either scenario, only the identification tag is stored in the stylus memory 503, and the identification tag as well as the decoded information is sent (via the Li-Fi transceiver 505) to the storage cloud 507. Thus, when the Li-Fi stylus 123 imparts the identification tag onto another Li-Fi enabled display (see below), then the computer associated with that other Li-Fi enabled display can retrieve the decoded information from the storage cloud 507 by using the identification tag. This embodiment allows a smaller stylus memory 503 to be used in the Li-Fi stylus 123.

With further regard to binary photosensor array 402, assume that binary photosensor array 402 includes a matrix of photoreceptors. As such, the Li-Fi stylus 123 can transmit (e.g., by using LEDs in the Li-Fi source/receiver 610 shown in FIG. 6) information-encoded light onto this matrix of photoreceptors, which is decoded by the binary photosensor array controller 502 for storage on the system (e.g., a computer 101) that is associated with the Li-Fi enabled display 309.

Consider now matrix barcode 404, which is generated and displayed under the control of a matrix barcode display controller 504. For illustrative purposes, assume that matrix barcode 404 only emits information to, and does not receive information from, the Li-Fi stylus 123. That is, a matrix barcode display controller 504 generates the matrix barcode 404, which is displayed on the Li-Fi enabled display 309. The matrix barcode 404 is a two-dimensional array of barcode that is read and interpreted (decoded) by the stylus controller 501 in the Li-Fi stylus 123. That is, photosensors within the Li-Fi stylus 123 (e.g., photosensors in the Li-Fi source/receiver 610 shown in FIG. 6) "see" the matrix barcode 404 and decode the information imparted (either directly or via embedded uniform resource locators—URLs) from the matrix barcode 404. This information is then stored in the stylus memory 503 and/or sent to the storage cloud 507, as described above for information received from the binary photosensor array 402.

Consider now file icon 406, which is generated and displayed under the control of a file icon display controller 506. For illustrative purposes, assume that file icon 406 only emits information to, and does not receive information from, the Li-Fi stylus 123. That is, the file icon display controller 506 generates the file icon 406, which is displayed on the Li-Fi enabled display 309. The file icon 406 is a unique image (e.g., with a specific title) that is read and interpreted (decoded) by the stylus controller 501 in the Li-Fi stylus 123. That is, photosensors (e.g., photosensors in the Li-Fi source/receiver 610 shown in FIG. 6) within the Li-Fi stylus 123 "see" the file icon 406 and identify the file/folder/database that is represented by the file icon 406. This identity of the file/folder/database is then stored in the stylus memory 503 and/or sent to the storage cloud 507, as described above for information received from the binary photosensor array 402.

Consider now text display 408, which is generated and displayed under the control of a file icon display controller 506. For illustrative purposes, assume that text display 408 only emits information (e.g., a text passage) to, and does not receive information from, the Li-Fi stylus 123. That is, the text display controller 508 generates the text display 408, which is displayed on the Li-Fi enabled display 309. The text display 408 is a passage of text, which is read (e.g., using optical character recognition—OCR logic within the stylus controller 501) by the Li-Fi stylus 123. That is, photosensors (e.g., photosensors in the Li-Fi source/receiver 610 shown in FIG. 6) within the Li-Fi stylus 123 "read" the text display 408, encode that text into ASCII or similar characters for storage in the stylus memory 503 and/or the storage cloud 507, as described above for information received from the binary photosensor array 402.

Consider now video display 410, which is generated and displayed under the control of a video display controller 510. For illustrative purposes, assume that video display 410 only emits information to, and does not receive information from, the Li-Fi stylus 123. That is, the video display controller 510 generates the video display 410 (i.e., still and/or moving images), which is displayed on the Li-Fi enabled display 309. Photosensors (e.g., photosensors in the Li-Fi source/receiver 610 shown in FIG. 6) within the Li-Fi stylus 123 capture the visual image(s) produced by the video display 410, and convert these image(s) into binary code which is then stored in the stylus memory 503 and/or sent to the storage cloud 507, as described above for information received from the binary photosensor array 402.

Thereafter, the information captured by the matrix barcode 404, file icon 406, text display 408, and/or video display 410 can be transferred to another binary photosensor array 402 on another Li-Fi enabled display. That is, the Li-Fi stylus 123 "scoops up" the information from any of elements 402, 404, 406, 408, or 410 from a first Li-Fi enabled display, and the deposits this information (using LEDs in the Li-Fi source/receiver 610 shown in FIG. 6) onto a photosensor array on a second Li-Fi enabled display.

Figure 6:
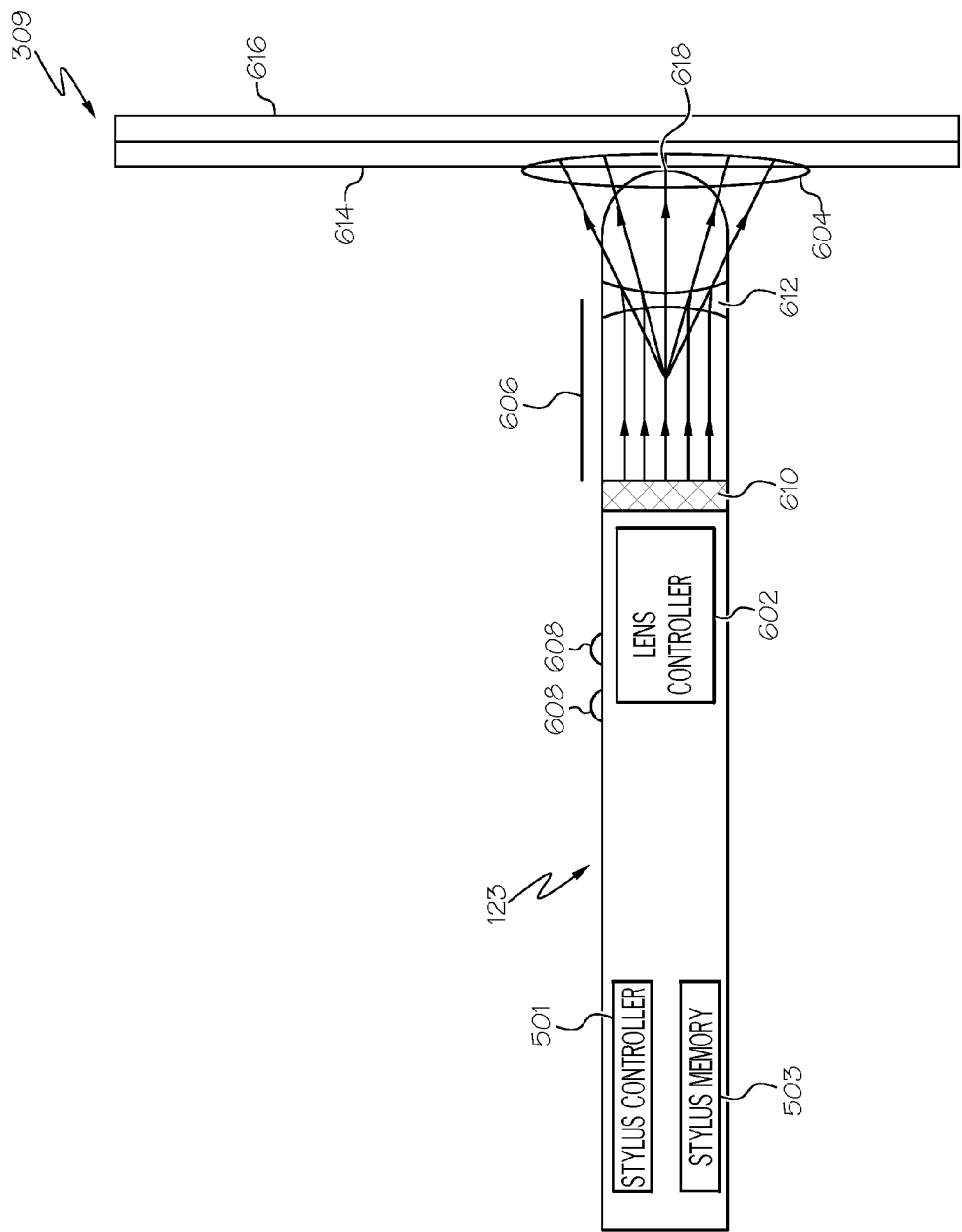
FIG. 6 illustrates additional detail of the novel Li-Fi stylus and Li-Fi enabled display shown in FIG. 4 in accordance with one or more embodiments of the present invention.

With regard now to FIG. 6, additional detail of the novel Li-Fi stylus 123 and Li-Fi enabled display 309 shown in FIG. 4 is presented in accordance with one or more embodiments of the present invention.

First, consider the Li-Fi enabled display 309. As depicted in FIG. 6, Li-Fi enabled display 309 has a display device surface 614 (e.g., a touch screen that is able to detect the Li-Fi stylus 123 touching the Li-Fi enabled display 309 at the touch point 618 at which the Li-Fi stylus 123 physically touches the Li-Fi enabled display 309). Behind the display device surface 614 is a photodiode array layer 616, which includes light emitting diodes (LEDs) capable of emitting information encoded light (as described above) and/or light sensitive photoreceptors that are capable of receiving information encoded light (as also described above).

As shown in FIG. 6, the light spread 604 of light being emitted from (or received by) the Li-Fi source/receiver 610 is variable according to the distance 606 that a lens 612 is from the Li-Fi source/receiver 610. For example, assume that photoreceptors within the Li-Fi source/receiver 610 are receiving information encoded light as described above. However, the area on the Li-Fi enabled display 309 is not fixed in accordance with one or more embodiments of the present invention. That is, when the Li-Fi stylus 123 is placed against (or near) the Li-Fi enabled display 309, the user selects which area of the Li-Fi enabled display 309 will be used to capture information therefrom by adjusting the light spread 604. In an embodiment of the present invention, the light spread 604 is visible, thus showing the user which area has been selected.

For example, assume that a user wants to capture the information from both matrix barcode 404 and file icon 406 shown in FIG. 4. The user will place the tip of the Li-Fi stylus 123 between the matrix barcode 404 and file icon 406, and will then press one of the lens controller buttons 608 shown in FIG. 6. This causes the lens 612 to move until the light spread 604 covers both the matrix barcode 404 and the file icon 406. A visible light from the Li-Fi source/receiver 610 may provide a visual cue of the size of the light spread 604. Furthermore, the Li-Fi stylus 123 now has a defined area from which to pull information off the Li-Fi enabled display 309, which is stored in the stylus memory 503.

Assume now that the user wants to impart the information that is stored in the stylus memory onto another Li-Fi enabled display (similar in structure to the Li-Fi enabled display 309 shown in FIG. 5). Assume further that a photodiode array layer 616 on this other Li-Fi enabled display has a photosensor array embedded therein. Each section of the photodiode array layer 616 may be devoted to a certain feature/function, such as receiving video streams to be uploaded to a social media website, receiving confidential information that is only to be stored on the second computer to which the other Li-Fi enabled display is coupled, etc. As such, the user of the Li-Fi stylus 123 will now position the Li-Fi stylus 123 against the Li-Fi enabled display 309 of the other computer, adjust the lens 612 to select a certain area on the Li-Fi enabled display 309, and will then transmit the information from the first computer to the second computer via the certain area on the Li-Fi enabled display 309.

Thus, one embodiment of the present invention presents a Li-Fi enabled stylus (Li-Fi stylus 123 shown in FIG. 6) that has a Li-Fi receiver (e.g., photoreceptors within the Li-Fi source/receiver 610 shown in FIG. 6); a stylus memory (e.g., stylus memory 503 shown in FIG. 6); a Li-Fi source (e.g., Li-Fi source/receiver 610 shown in FIG. 6), and a movable lens (e.g., lens 612 shown in FIG. 6). As described herein, the Li-Fi receiver detects multiple channels of information-encoded light from a first Li-Fi enabled display (e.g., a first instance of Li-Fi enabled display 309 shown in FIG. 6). That is, based on the position of the lens 612 (as manipulated by the lens controller 602), light is received from and sent to various light emitters/receptors in the Li-Fi enabled display 309. Thus, light going to and from each of these different light emitters/receptors constitutes a separate data transmission channel.

The stylus memory stores information contained in the multiple channels of information-encoded light from the first Li-Fi enabled display (i.e., received by the Li-Fi receiver). The Li-Fi source transmits the information stored in the stylus memory onto a second Li-Fi enabled display via the same or other multiple channels of information-encoded light, as dictated by the positioning of the lens 612 within the Li-Fi stylus 123. That is, the movable lens adjusts a range of view of the Li-Fi enabled stylus, thus defining the different channels.

In an embodiment, the first Li-Fi enabled display and the second Li-Fi enabled display are different displays. That is, information is captured from one system and imparted onto another system. However, in another embodiment, the first Li-Fi enabled display and the second Li-Fi enabled display are the same display. That is, information is captured from one section of the Li-Fi enabled display (e.g., a section that is devoted to simply displaying videos) and is then deposited onto another section of the same Li-Fi enabled display (e.g., a section that is devoted to uploading videos for transmission to a social media website).

Figure 7:
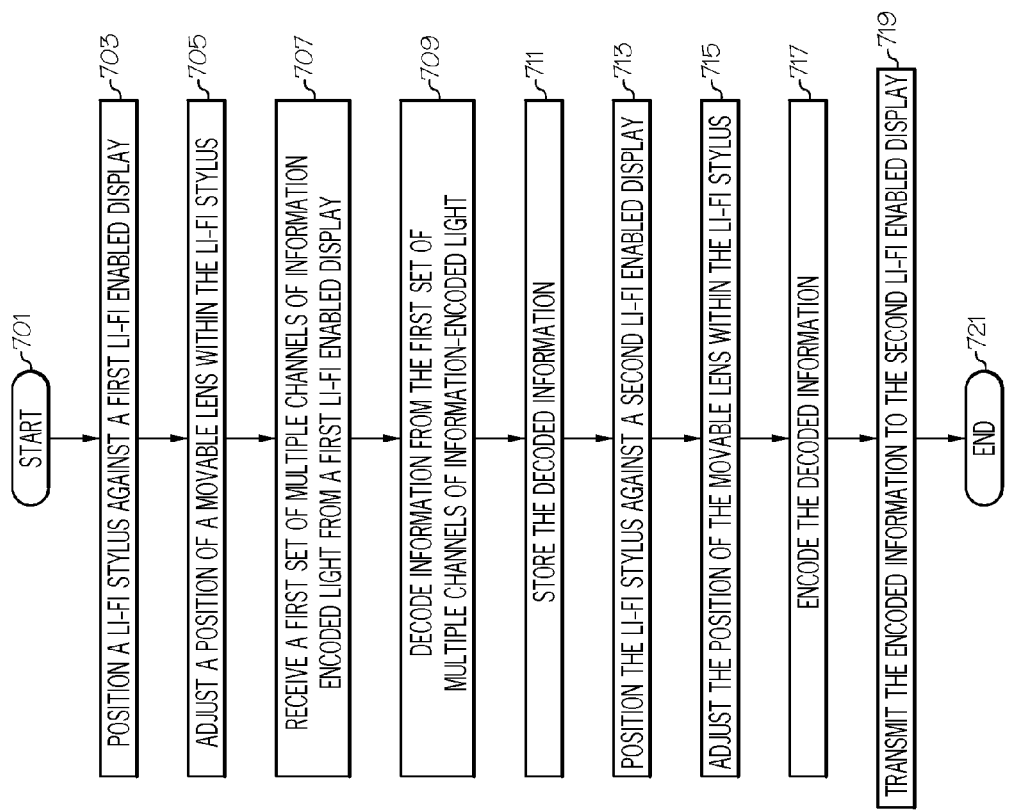
FIG. 7 is a high-level flow chart of one or more steps performed by a processor to move information from a first Li-Fi enabled display to a second Fi-Fi enabled display using the novel Li-Fi stylus shown in FIG. 5 in accordance with one or more embodiments of the present invention.

With reference now to FIG. 7, a high-level flow chart of one or more steps performed by a Li-Fi stylus to move information from a first Li-Fi enabled display to a second Li-Fi enabled display in accordance with one or more embodiments of the present invention is presented.

After initiator block 701, a Li-Fi stylus (e.g., Li-Fi stylus 123 shown in FIG. 5) is positioned against a first Li-Fi enabled display (e.g., a first instance of Li-fi enabled display 309 shown in FIG. 5), as described in block 703.

As described in block 705, a lens controller (e.g., lens controller 602 shown in FIG. 6) within the Li-Fi stylus adjusts a position of a movable lens (e.g., lens 612 shown in FIG. 6) within the Li-Fi stylus, where moving the position (e.g., as shown by distance 606 in FIG. 6) of the movable lens adjusts a reception range of view (as denoted by a first instance of the light spread 604 shown in FIG. 6) of the Li-Fi enabled stylus for receiving a first set of multiple channels of information-encoded light from the first Li-Fi enabled display (e.g., light being emitted from one or more of the elements shown on the Li-Fi enabled display 309 as depicted in FIG. 4) as the Li-Fi stylus is positioned against the first Li-Fi enabled display.

As described in block 707, a Li-Fi receiver (e.g., photoreceptors within the Li-Fi source/receiver 610 shown in FIG. 6) within a Li-Fi stylus receives the first set of multiple channels of information-encoded light from the first Li-Fi enabled display. As described herein, the first set of multiple channels of information-encoded light is selectively received by the Li-Fi receiver within the Li-Fi stylus according to the reception range of view of the Li-Fi enabled stylus.

As described in block 709, a stylus controller (e.g., stylus controller 501 shown in FIG. 6) decodes information from the first set of multiple channels of information-encoded light.

As described in block 711, one or more processors (e.g., within stylus controller 501) then store, into a stylus memory (e.g., stylus memory 503 shown in FIG. 6) within the Li-Fi stylus, the decoded information from the first set of multiple channels of information-encoded light from the first Li-Fi enabled display.

As described in block 713, the user then positions the Li-Fi stylus against a second Li-Fi enabled display (e.g., a second instance of the Li-Fi enabled display 309).

As described in block 715, the lens controller within the Li-Fi stylus adjusts the position of the movable lens within the Li-Fi stylus as the Li-Fi stylus is positioned against the second Li-Fi enabled display. As described herein, moving the position of the movable lens adjusts a transmission range of view (e.g., a second instance of the light spread 604 shown in FIG. 6) of the Li-Fi enabled stylus for transmitting a second set of multiple channels of information-encoded light to a second Li-Fi enabled display as the Li-Fi stylus is positioned against the second Li-Fi enabled display.

As described in block 717, the stylus controller encodes the decoded information stored in the stylus memory to create encoded information.

As described in block 719, a Li-Fi transmitter (e.g., LEDs within the Li-Fi source/receiver 610 shown in FIG. 6) within the Li-Fi stylus transmit the encoded information via the second set of multiple channels of information-encoded light to the second Li-Fi enabled display. As described herein, the second set of multiple channels of information-encoded light are selectively transmitted from the Li-Fi stylus to the second Li-Fi enabled display according to the transmission range of view of the Li-Fi enabled stylus.

The flow-chart ends at terminator block 721.

In an embodiment of the present invention, the information is copied from the first Li-Fi enabled display to the second Li-Fi enabled display (such that the first computer and the second computer both have a copy of the information).

In an embodiment of the present invention, the information is moved from the first Li-Fi enabled display to the second Li-Fi enabled display (such that only the second computer now has a copy of the information).

As described herein and in an embodiment of the present invention, the information from the first set of multiple channels of information-encoded light is a stream of data being transmitted from a binary light emitting diode (LED) array (e.g., LEDs in the binary photosensor array 402 shown in FIG. 5) in the first Li-Fi enabled display. In one or more versions of this embodiment, one or more processors (e.g., within stylus controller 501) decode the stream of data being transmitted from the LED array in the first Li-Fi enabled display.

As described herein and in an embodiment of the present invention, the information from the first set of multiple channels of information-encoded light is information from a matrix barcode (e.g., matrix barcode 404 shown in FIG. 5) being displayed on the first Li-Fi enabled display. In one or more versions of this embodiment, one or more processors (e.g., within stylus controller 501) decode the matrix barcode.

As described herein and in an embodiment of the present invention, the information from the first set of multiple channels of information-encoded light is an image of a file icon (e.g., file icon 406 shown in FIG. 5) being displayed on the first Li-Fi enabled display. In one or more versions of this embodiment, one or more processors (e.g., within the stylus controller 501) decode the file icon, and then retrieve information from a file that is represented by the file icon.

As described herein and in an embodiment of the present invention, the information from the first set of multiple channels of information-encoded light is an image of text (e.g., text display 408 shown in FIG. 5) being displayed on the first Li-Fi enabled display. In one or more versions of this embodiment, one or more processors (e.g., within the stylus controller 501) interpret the image of the text to create an electronic text file, and then store the electronic text file in a memory (e.g., stylus memory 503 and/or storage cloud 507 shown in FIG. 5).

As described herein and in an embodiment of the present invention, the information from the first set of multiple channels of information-encoded light is an image of a video being displayed on the first Li-Fi enabled display. In one or more embodiments of this embodiment, one or more processors (e.g., within stylus controller 501) convert the image of the video into a digital video file, and then store the digital video file in a memory (e.g., stylus memory 503 and/or storage cloud 507 shown in FIG. 5).

As described herein and in an embodiment of the present invention, the information from the first set of multiple channels of information encoded light comprises an identifier of the information from the first set of multiple channels of information-encoded light and the information from the first set of multiple channels of information-encoded light. In one or more versions of this embodiment, one or more processors (e.g., within stylus controller 501) store only the identifier in the stylus memory; store the information and the identifier in a remote storage device; and transmit, by the Li-Fi stylus, only the identifier from the Li-Fi stylus to the second Li-Fi enabled display. As described herein, this enables the second Li-Fi enabled display to retrieve the information from the remote storage device using the identifier.

As described herein and in an embodiment of the present invention, the remote storage device is a cloud-based storage device (e.g., part of storage cloud 507).

Thus, as described herein, one or more embodiments of the present invention enable a user to control the distance of the lens in a stylus to control the spread of the light, and thus the area on the touch device eligible for copying data to or from. The selected object(s) on the display can be tagged, and additional information can be attached with the object.

The photodiode array on the display will receive the Li-Fi signal (light area) and accordingly the received data will be available on that portion of the digital content.

When the stylus is in a mode to receive data or files, then the user can select the object or objects through light indication. Accordingly, the file or files in the light area will be transferred to the stylus upon the user's command. Similarly, the stylus will use light to allow the user to select the area to drop off files when so commanded by the user.

As described herein, the positioning of the lens in the stylus can be adjusted, which allows the "light area" to cover more or less area of the pointed-to screen, which automatically allows the selection of more or fewer files, pictures and or folders to be transmitted to the stylus' internal storage (or a cloud repository in some embodiments), etc. as described herein.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
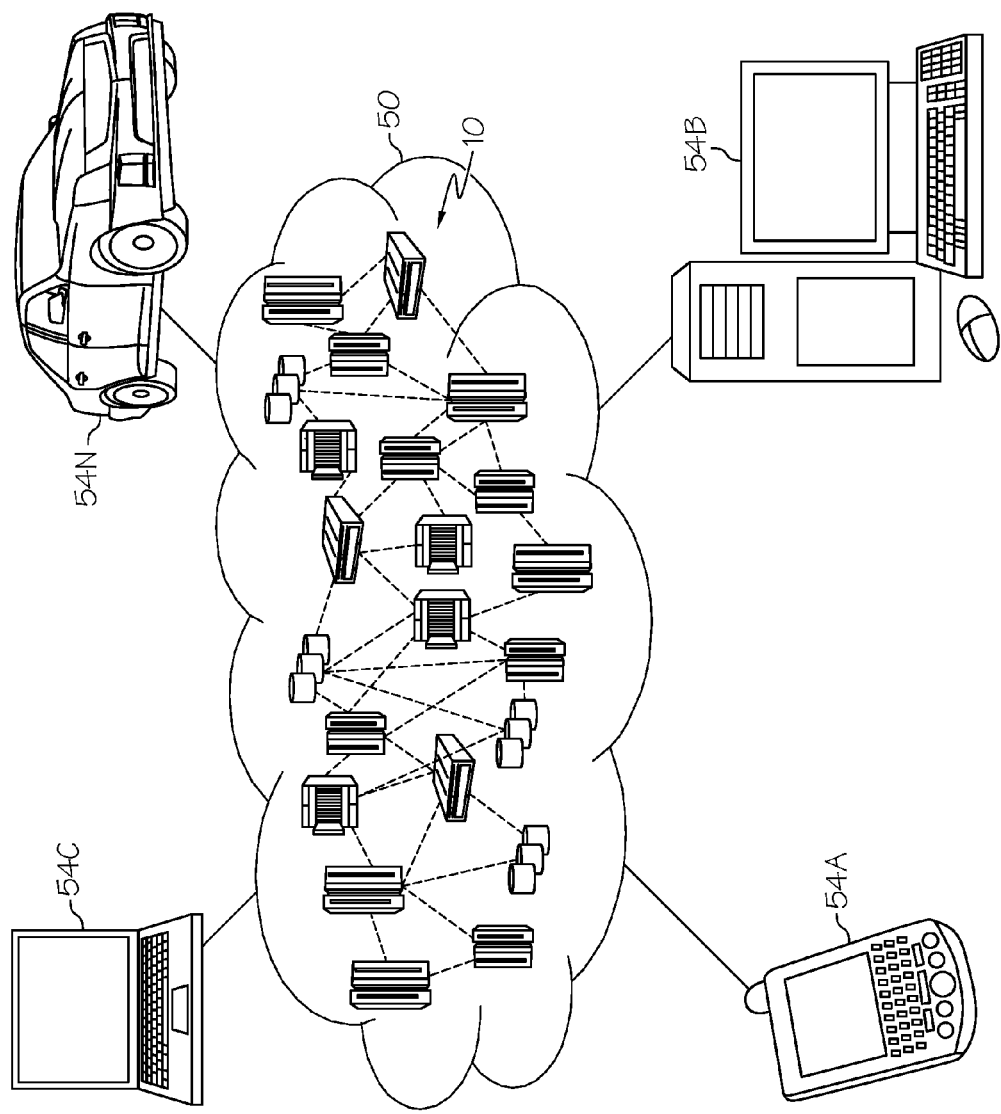
FIG. 8 depicts a cloud computing node according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
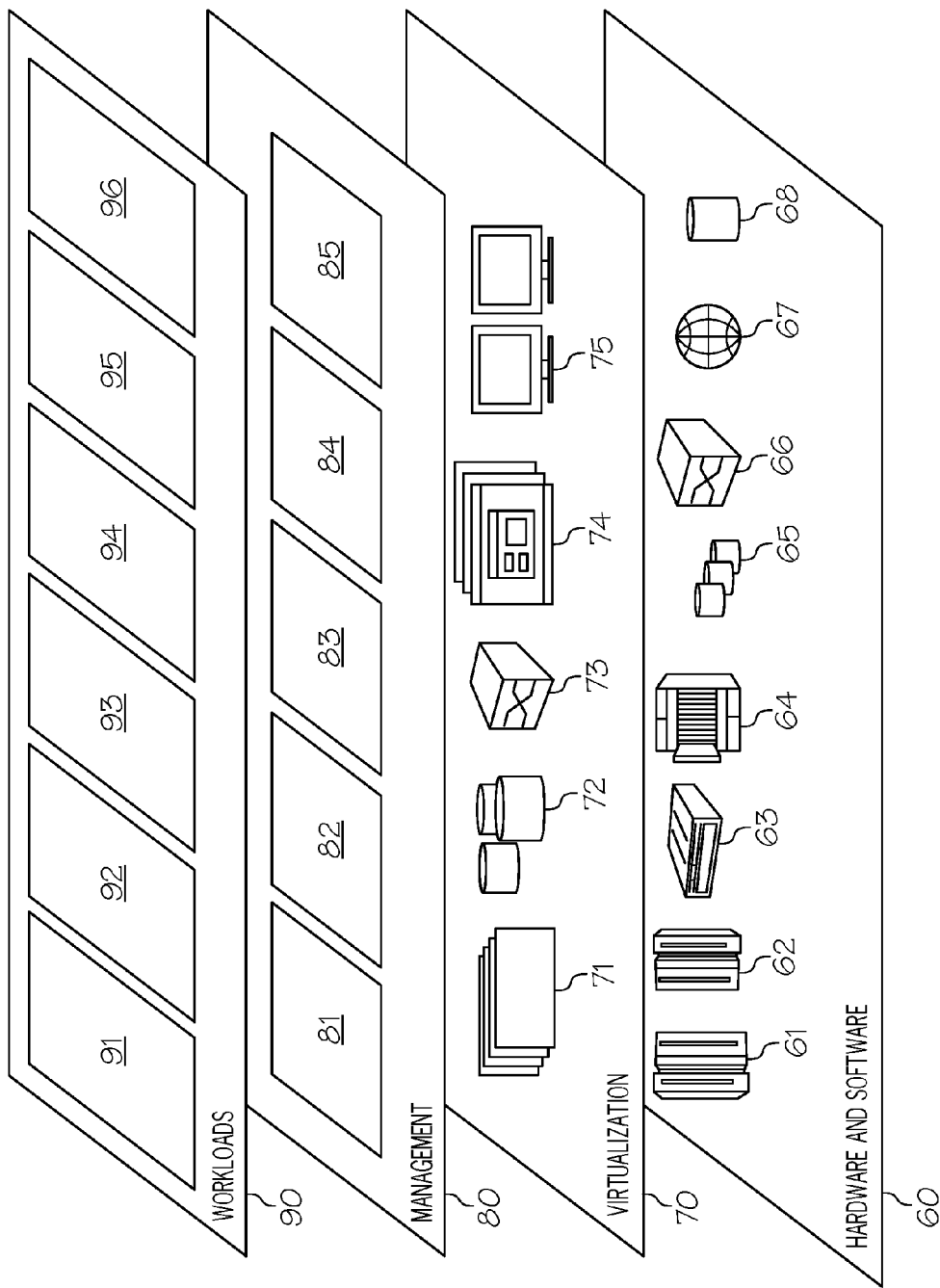
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Li-Fi stylus operation processing 96, which performs one or more of the processes described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:
1. A Li-Fi enabled stylus comprising:
 a Li-Fi receiver, wherein the Li-Fi receiver detects multiple channels of information-encoded light from a first Li-Fi enabled display;
 a stylus memory, wherein the stylus memory stores information contained in the multiple channels of information-encoded light from the first Li-Fi enabled display;
 a Li-Fi source, wherein the Li-Fi source transmits the information stored in the stylus memory onto a second Li-Fi enabled display via multiple channels of information-encoded light; and
 a movable lens, wherein the movable lens adjusts a range of view of the Li-Fi enabled stylus.
2. The Li-Fi enabled stylus of claim 1, wherein the first Li-Fi enabled display and the second Li-Fi enabled display are different displays.
3. The Li-Fi enabled stylus of claim 1, further comprising:
 a electromechanical lens controller that physically moves the movable lens in order to adjust the range of view of the Li-Fi enabled stylus.

4. A method comprising:
positioning a Li-Fi stylus against a first Li-Fi enabled display;
adjusting, by a lens controller within the Li-Fi stylus, a position of a movable lens within the Li-Fi stylus, wherein moving the position of the movable lens adjusts a reception range of view of the Li-Fi enabled stylus for receiving a first set of multiple channels of information-encoded light from the first Li-Fi enabled display as the Li-Fi stylus is positioned against the first Li-Fi enabled display;
receiving, by a Li-Fi receiver within the Li-Fi stylus, the first set of multiple channels of information-encoded light from the first Li-Fi enabled display, wherein the first set of multiple channels of information-encoded light are selectively received by the Li-Fi receiver within the Li-Fi stylus according to the reception range of view of the Li-Fi enabled stylus;
decoding, by a stylus controller, information from the first set of multiple channels of information-encoded light;
storing, into a stylus memory within the Li-Fi stylus, the decoded information from the first set of multiple channels of information-encoded light from the first Li-Fi enabled display;
positioning the Li-Fi stylus against a second Li-Fi enabled display;
adjusting, by the lens controller within the Li-Fi stylus, the position of the movable lens within the Li-Fi stylus, wherein moving the position of the movable lens adjusts a transmission range of view of the Li-Fi enabled stylus for transmitting a second set of multiple channels of information-encoded light to a second Li-Fi enabled display as the Li-Fi stylus is positioned against the second Li-Fi enabled display;
encoding, by the stylus controller, the decoded information stored in the stylus memory to create encoded information; and
transmitting, by a Li-Fi transmitter within the Li-Fi stylus, the encoded information via the second set of multiple channels of information-encoded light to the second Li-Fi enabled display, wherein the second set of multiple channels of information-encoded light are selectively transmitted from the Li-Fi stylus to the second Li-Fi enabled display according to the transmission range of view of the Li-Fi enabled stylus.

5. The method of claim 4, wherein the information is copied from the first Li-Fi enabled display to the second Li-Fi enabled display.

6. The method of claim 4, wherein the information is moved from the first Li-Fi enabled display to the second Li-Fi enabled display.

7. The method of claim 4, wherein the information from the first set of multiple channels of information-encoded light is a stream of data being transmitted from a binary light emitting diode (LED) array in the first Li-Fi enabled display, and wherein the method further comprises:
decoding, by one or more processors, the stream of data being transmitted from the LED array in the first Li-Fi enabled display.

8. The method of claim 4, wherein the information from the first set of multiple channels of information-encoded light is information from a matrix barcode being displayed on the first Li-Fi enabled display, and wherein the method further comprises:
decoding, by one or more processors, the matrix barcode.

9. The method of claim 4, wherein the information from the first set of multiple channels of information-encoded light is an image of a file icon being displayed on the first Li-Fi enabled display, and wherein the method further comprises:
identifying, by one or more processors, the file icon; and
retrieving, by one or more processors, information from a file that is represented by the file icon.

10. The method of claim 4, wherein the information from the first set of multiple channels of information-encoded light is an image of text being displayed on the first Li-Fi enabled display, and wherein the method further comprises:
interpreting, by one or more processors, the image of the text to create an electronic text file; and
storing, by one or more processors, the electronic text file in a memory.

11. The method of claim 4, wherein the information from the first set of multiple channels of information-encoded light is an image of a video being displayed on the first Li-Fi enabled display, and wherein the method further comprises:
converting, by one or more processors, the image of the video into a digital video file; and
storing, by one or more processors, the digital video file in a memory.

12. The method of claim 4, wherein the information from the first set of multiple channels of information encoded light comprises an identifier of the information from the first set of multiple channels of information-encoded light and the information from the first set of multiple channels of information-encoded light, wherein the method further comprises:
storing, by one or more processors, only the identifier in the stylus memory;
storing, by one or more processors, the information and the identifier in a remote storage device; and
transmitting, by the Li-Fi stylus, only the identifier from the Li-Fi stylus to the second Li-Fi enabled display, wherein the second Li-Fi enabled display is enabled to retrieve the information from the remote storage device using the identifier.

13. The method of claim 12, wherein the remote storage device is a cloud-based storage device.

14. A computer program product for moving information from a first Li-Fi enabled display to a second Li-Fi enabled display, the computer program product comprising a non-transitory computer readable storage medium having program code embodied therewith, the program code readable and executable by a processor to perform a method comprising:
adjusting, by a lens controller within a Li-Fi stylus, a position of a movable lens within the Li-Fi stylus while the Li-Fi stylus is positioned against a first Li-Fi enabled display, wherein moving the position of the movable lens adjusts a reception range of view of the Li-Fi enabled stylus for receiving a first set of multiple channels of information-encoded light from the first Li-Fi enabled display as the Li-Fi stylus is positioned against the first Li-Fi enabled display;
receiving, by a Li-Fi receiver within the Li-Fi stylus, the first set of multiple channels of information-encoded light from the first Li-Fi enabled display, wherein the first set of multiple channels of information-encoded light are selectively received by the Li-Fi receiver within the Li-Fi stylus according to the reception range of view of the Li-Fi enabled stylus;
decoding, by a stylus controller, information from the first set of multiple channels of information-encoded light;

storing, into a stylus memory within the Li-Fi stylus, the decoded information from the first set of multiple channels of information-encoded light from the first Li-Fi enabled display;

adjusting, by the lens controller within the Li-Fi stylus, the position of the movable lens within the Li-Fi stylus as the Li-Fi stylus is positioned against a second Li-Fi enabled display, wherein moving the position of the movable lens adjusts a transmission range of view of the Li-Fi enabled stylus for transmitting a second set of multiple channels of information-encoded light to a second Li-Fi enabled display as the Li-Fi stylus is positioned against the second Li-Fi enabled display;

encoding, by the stylus controller, the decoded information stored in the stylus memory to create encoded information; and transmitting, by a Li-Fi transmitter within the Li-Fi stylus, the encoded information via the second set of multiple channels of information-encoded light to the second Li-Fi enabled display, wherein the second set of multiple channels of information-encoded light are selectively transmitted from the Li-Fi stylus to the second Li-Fi enabled display according to the transmission range of view of the Li-Fi enabled stylus.

15. The computer program product of claim 14, wherein the information is moved from the first Li-Fi enabled display to the second Li-Fi enabled display.

16. The computer program product of claim 14, wherein the information from the first set of multiple channels of information-encoded light is a stream of data being transmitted from a binary light emitting diode (LED) array in the first Li-Fi enabled display, and wherein the method further comprises:

decoding the stream of data being transmitted from the LED array in the first Li-Fi enabled display.

17. The computer program product of claim 14, wherein the information from the first set of multiple channels of information-encoded light is an image of a file icon being displayed on the first Li-Fi enabled display, and wherein the method further comprises:

identifying the file icon; and retrieving information from a file that is represented by the file icon.

18. The computer program product of claim 14, wherein the information from the first set of multiple channels of information-encoded light is an image of text being displayed on the first Li-Fi enabled display, and wherein the method further comprises:

interpreting the image of the text to create an electronic text file; and storing the electronic text file in a memory.

19. The computer program product of claim 14, wherein the information from the first set of multiple channels of information-encoded light is an image of a video being displayed on the first Li-Fi enabled display, and wherein the method further comprises:

converting the image of the video into a digital video file; and storing the digital video file in a memory.

20. The computer program product of claim 14, wherein the information from the first set of multiple channels of information encoded light comprises an identifier of the information from the first set of multiple channels of information-encoded light and the information from the first set of multiple channels of information-encoded light, wherein the method further comprises:

storing only the identifier in the stylus memory;

storing the information and the identifier in a remote storage device; and transmitting, by the Li-Fi stylus, only the identifier from the Li-Fi stylus to the second Li-Fi enabled display, wherein the second Li-Fi enabled display is enabled to retrieve the information from the remote storage device using the identifier.

\* \* \* \* \*